Figure 1:
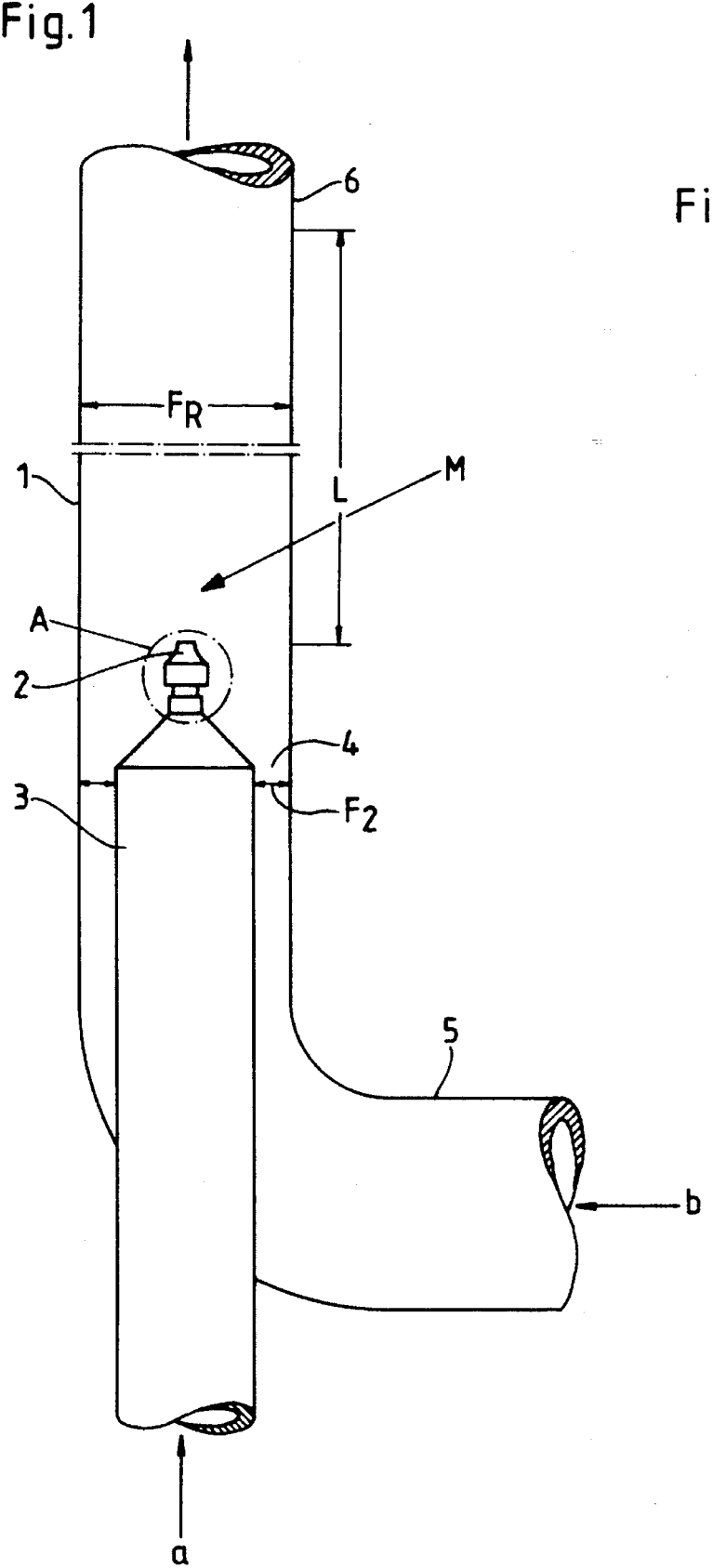

United States Patent [19]

Groth et al.

[11] Patent Number: 5,493,004
[45] Date of Patent: Feb. 20, 1996

[54] PROCESS FOR THE PREPARATION OF POLYSUCCINIMIDE

[75] Inventors: Torsten Groth; Winfried Joentgen, both of Köln; Dorde Jovcic, Burscheid; Paul Wagner, Düsseldorf; Hans-Joachim Traenckner, Leverkusen, all of Germany

[73] Assignee: Bayer AG, Leverkusen

[21] Appl. No.: 224,769

[22] Filed: Apr. 8, 1994

[51] Int. Cl.$^6$ ............................................ C08G 69/00
[52] U.S. Cl. ........................... 528/363; 528/328; 528/360; 525/418; 525/419; 525/420
[58] Field of Search .................... 528/328, 360, 528/363; 525/418, 419, 420

[56] References Cited

U.S. PATENT DOCUMENTS

| | | | |
|---|---|---|---|
| 3,846,380 | 11/1974 | Fujimoto et al. | 525/420 |
| 4,590,260 | 5/1986 | Harada et al. | 528/328 |
| 4,696,981 | 9/1987 | Harada et al. | 525/328.2 |
| 4,839,461 | 6/1989 | Boehmke | 528/363 |
| 5,219,952 | 6/1993 | Koskan et al. | 525/419 |
| 5,288,783 | 2/1994 | Wood | 525/418 |
| 5,296,578 | 3/1994 | Koskan et al. | 528/363 |
| 5,328,631 | 7/1994 | Du Vosel et al. | 252/174.23 |
| 5,393,868 | 2/1995 | Freeman et al. | 528/480 |

FOREIGN PATENT DOCUMENTS

EP-A
0578448  1/1994  European Pat. Off. .

OTHER PUBLICATIONS

Dessaignes, The Quarterly Journal of The Chemical Society of London, vol. III, pp. 187 and 188, (1851), Translation of Compt. Rend XXX, 324.
Dessaignes, Compt. Rend. XXXI, pp. 432 and 433 (1850).
Kovacs et al., J. Org. Chem. vol. 26, pp. 1084–1091 (1961).
Harada, J. Org. Chem. vol. 24, pp. 1662–1666 (Mar. 1959).

*Primary Examiner*—P. Hampton-Hightower
*Attorney, Agent, or Firm*—Connolly & Hutz

[57] ABSTRACT

The invention relates to an improved process for the preparation of polysuccinimide from maleic anhydride and ammonia, characterized in that the starting compounds are brought to reaction in liquid form in a tubular reactor with feed nozzle at temperatures of preferably 50° C. to 500° C. and residence times of preferably 0.1 to 600 seconds and the resulting reaction mixture is possibly further polymerized thermally in a high-viscosity reactor preferably continuously operated at 120° C. to 300° C.

21 Claims, 1 Drawing Sheet

U.S. Patent                 Feb. 20, 1996                 5,493,004

PROCESS FOR THE PREPARATION OF POLYSUCCINIMIDE

The invention relates to a process for the preparation of polysuccinimide by reaction of maleic acid anhydride with ammonia in a tubular reactor with feed nozzle, possibly further polymerization of the resulting reaction mixture, e.g. in a high-viscosity reactor, and a process for the preparation of polyaspartic acid.

The preparation and use of polyaspartic acid (PAA) and derivatives thereof has long been the subject-matter of numerous publications and patents. Thus, the preparation can be carried out by thermal polycondensation of aspartic acid (J. Org. Chem. 26, 1084 (1961)).

U.S. Pat. No. 4,839,461 (=EP-A 0 256 366) describes the preparation of polyaspartic acid from maleic acid anhydride, water and ammonia. Maleic acid anhydride is converted into the monoammonium salt in an aqueous medium with addition of concentrated ammonia solution. The monoammonium salt is polymerized in the melt to give polysuccinimide and is converted by hydrolysis into PAA or a salt thereof, c.f. WO 93/23452. U.S. Pat. No. 4,590,260 discloses subjecting amino acids, together with derivatives of malic, maleic and/or fumaric acid, to a polycondensation at 100° to 225° C. According to U.S. Pat. No. 4,696,981, microwaves are used in such reactions.

In DE-A 2 253 190 (=U.S. Pat. No. 3,846,380), a process is described for the preparation of polyamino acid derivatives, especially polyaspartic acid derivatives. According to this, apart from aspartic acid, maleic acid derivatives (monoammonium salt and monoamide) are also used for the preparation by thermal polymerization of the intermediate polysuccinimide, which itself can be reacted with amines in suitable solvents to give the desired derivatives.

Polyaspartic acid can be used according to EP-A 256 366 (U.S. Pat. No. 4,839,461) to remove scale caused by hardness-forming agents of water (scale inhibition and scale deposition removal). According to U.S. Pat. No. 5,116,513 and EP-A-454 126, polyaspartic acid and salts thereof are active constituents of detergents and fertilizers.

The invention relates to an improved process for the preparation of polysuccinimide from maleic acid anhydride and ammonia, characterized in that the starting compounds are brought to reaction in liquid form, especially in an aqueous medium, in a tubular reactor with feed nozzle at temperatures of preferably 50° C. to 500° C., especially 100° C. to 450° C. and residence times of preferably 0.1 to 600 seconds, especially 0.1 to 60 seconds. The resulting reaction mixture can be further polymerized thermally, e.g. in a high-viscosity reactor preferably continuously operated at 120° C. to 300° C.

In a preferred embodiment, the starting compounds are molten maleic acid anhydride (MAA) and ammonia solution, particularly preferably aqueous ammonia solution.

To prepare the polysuccinimide, preferably 0.9 to 1.1 mol of ammonia are used per mol of maleic acid anhydride, preferably equimolar amounts.

The polysuccinimide prepared according to the invention contains in a preferred embodiment essentially repeating succinimide units of the following structure:

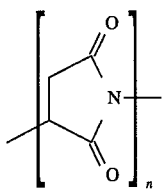

In addition, by suitable reaction conditions and choice of starting compounds, other repeating units can be contained, e.g.

a) Aspartic acid units of the formulae

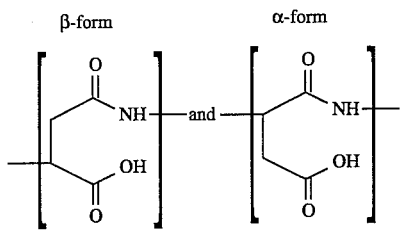

b) Malic acid units of the formulae

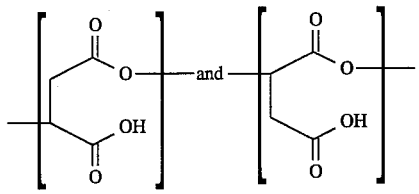

c) Maleic acid and fumaric acid units of the formulae

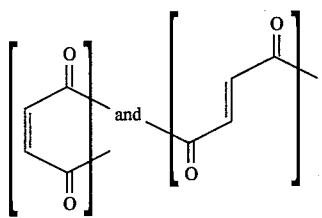

The analysis of the chemical structure is preferably carried out by $^{13}C$—NMR, FT—IR and, after total hydrolysis, by HPLC, GC and GC/MS.

In a preferred embodiment, ammonia solutions, particularly preferably aqueous $NH_3$ solutions, are completely mixed and brought to reaction with a maleic acid anhydride melt in a tubular reactor with feed nozzle by the principle of liquid-liquid jet-mixing. Such reactors are disclosed by Zehner, P. and Bittins, K.: Fortschr. Verf. Technik D 23, 1985, p. 373–393, and by Tebel, K. H.; May H.-O.: Der Freistrahlrohrreaktor, Chem. Ing. Techn. 60, 1988, Heft. 11. In such reactors the starting compounds are simultaneously and continuously introduced into the reactor with different velocities and an intensive mixing is effected by the difference of the flow velocities, and thus the reaction is to a large extent completed in this reactor. In a preferred embodiment the mixing is performed with or without backmixing. The reaction itself is performed preferably with no or less backmixing, preferably if homogenous product quality is desired.

Such jet mixers are used highly effectively for mixing liquid components. The primary component a, in this case preferably MAA melt, is injected as a free jet by means of the nozzle directly into the liquid stream of the secondary component b, in this case preferably aqueous $NH_3$ solution. The addition of the components can also be carried out the other way round. The turbulence generated by the free jet and the relative velocity of the two liquid streams leads to very rapid complete mixing or emulsifying of the components. In one preferred embodiment the velocity of component a is greater by a factor of 10 to 300 (without this figure being intended to be a restriction) than the flow velocity of component b. Large shear forces are generated during this in the mixing space M, which lead to a rapid vortexing of the two liquids, to a so-called macromixing. The good macromixing is a precondition for the micromixing proceeding on a molecular scale and for quantitative reaction of the components.

The mixing and reaction of the components can proceed, depending on the concentration of the ammonia solution, at temperatures of 50° C. to 500° C., preferably at 100° C. to 450° C., particularly preferably at 150° C. to 400° C. The temperature should be set so that crystallization of the product or product mixture and thus blockades are avoided.

The residence times in the tubular reactor with feed nozzle can be chosen as desired, depending on the desired composition of the reaction mixture. Residence times of up to a few minutes are preferred. Residence times of 0.1 to 600, in particular 0.1 to 60 seconds are particularly preferred.

The reaction chamber must, moreover, be of a type such that evaporation of volatile compounds from the reaction mixture can be regulated. Tubular reactors with feed nozzles having pressurizing valves in the form of an orifice are particularly suitable for this. The nozzle cross-sections in the orifice are designed to maintain the necessary pressures in accordance with the particular temperature relationships and consistency of the reaction products in the reactor.

Figure 2:
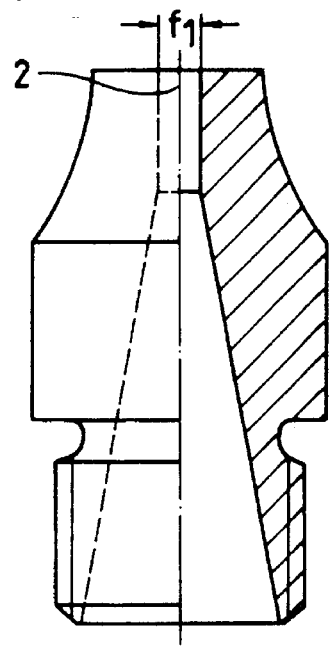

The preferred reactor is shown diagrammatically in the drawing FIG. 1 and is described in more detail below. In the figures FIG. 1 shows the reactor in section and FIG. 2 shows the nozzle according to detail A, half in section, in enlargement.

By way of example, the tubular reactor with feed nozzle can be constructed in the following manner:

A feed for the maleic acid anhydride opens out axially via a nozzle 2 into a reaction tube 1. The feed is concentrically surrounded by an annular nozzle 4 which is connected to a feed 5 for the aqueous ammonia solution. The length of the reaction zone L depends on the desired residence time; the subsequent tube section 6 serves as a transport pipe for the reaction product.

Instead of an annular nozzle 4, a plurality of individual nozzles or nozzle orifices can alternatively be distributed over the circumference.

The residence time in the reactors is preferably chosen so that a complete reaction of the starting compounds used, MAA and $NH_3$, is ensured. Due to the reaction conditions maleic acid anhydride (MAA) can be polymerised to polysuccinimide via the mono- or diammonium salt of maleic acid, maleamic acid or the ammonium salt of maleamic acid. To terminate the polymerization, other continuous flow reactors can be used such as rotor/stator systems, a tubular reactor possibly with a static mixer, a pipe coil and stirred tanks. Alternatively, the reaction can also be brought to completion in discontinuously operated stirred tanks.

The advantages of this mixing and reaction technique for preparing precursors or product mixtures in solution or solvent-containing melts for the preparation of polysuccinimide are the realization of very short mixing times, short reaction times, avoidance of undesired reactions, complete reaction of the reactants, high mass flows with low engineering expense and short residence time in the seconds range, saving of process steps, and thus reduction of the production and process costs and a continuous process with reproducible quality.

The mixtures obtained, because of the special manner of their formation, are particularly highly suitable for further polymerization in high-viscosity reactors. The reaction products, depending on water content or solvent content, owing to the energy of reaction released, are hot solutions or solvent-containing or aqueous melts. The energy of reaction can be used completely in the polymerization process in the high-viscosity reactors. The hot reaction products can be passed directly from the tubular reactor with feed nozzle, possibly with the use of a tube, to ensure the desired residence time into the high-viscosity reactor. As a result, the use of additional process energy in the overall process is minimized and the efficiency is increased.

It is particularly advantageous in the liquid-liquid jet mixing of MAA melt and ammonia that, with increasing concentration of $NH_3$ in the solution, the reaction products convert from hot solutions to solvent-containing melts. In these melts, a substantial conversion of the maleic acid anhydride to oligomers and polymers has already taken place. This is in turn advantageous for the polymerization in the high-viscosity reactors.

When these solvent-containing melts are used, the polymerization times are significantly reduced and as a result of the smaller amount of solvent and reaction water in the system, significantly higher mass flows in the high-viscosity reactors can be achieved. By changing the conditions, such as for example prolonging the residence time in the tubular reactor with feed nozzle, the degree of polymerization can be increased to the extent that, in a particularly preferred embodiment, a secondary polymerization in one of the mentioned high-viscosity reactors is not necessary.

In this case, reaction mixtures virtually free of starting materials can be generated in the tubular reactor with feed nozzle. The reaction mixtures, apart from polymer-bound succinimide units, can also contain polymer-bound aspartic acid units.

The high-viscosity reactors which are suitable are all apparatus which permit removal of the steam released, preferably those having large reaction volumes, preferably also those having dynamic self-cleaning of the product-contact surfaces and, likewise preferably, those having shaft heating. For reasons of corrosion resistance, machines made of corrosion-resistant material, for example stainless steel, are preferably used.

By way of example, a screw machine of the "Selfcleaner" type of the Lurgi company can be used:

The "Selfcleaner" is a continuously self-cleaning co-rotating twin screw machine having hollow shafts through which flows a heat transport medium for heating. The product to be treated is continuously transported in this case through the barrel of the apparatus by the rotating hollow screws. Above the screw shafts is situated a gas space vent for removing the vapours.

The liquid heat transport medium first flows through the hollow shafts then enters into the last hollow flight in the vicinity of the product outlet and flows through the hollow flights in counter-current to the product transported in the barrel. The resulting steam is removed in the product direction, preferably via special vent sections. The hollow screws in the "Selfcleaner" have a self-cleaning round profile, so that one screw continuously cleans the other. The thread of the one hollow screw projects, up to a certain play, right into the thread gap up to the hollow shaft of the other screw. The hollow shafts are welded from shaped metal sheets and are generally not mechanically reworked.

In the "Selfcleaner", products which are difficult to treat are preferably processed, which have a tendency on heat treatment to stick and especially encrust on the heating surfaces. The product is transported in the thread gaps of the two hollow screws in the form of an open figure of eight. In the meshing region of the hollow screws, the product is mixed by the relative velocity of the hollow screws.

According to the invention, other large-volume high-viscosity reactors can also be used, for example the type "AP-Conti" of the List company and screw heat exchangers. For the further processing or polymerization of solvent-containing melts, polymer screws or compounding screws are preferably to be used according to the invention. Other reactor types to be used according to the invention are the belt reactor (belt dryer), roller dryer or the pipe coil.

The polymerization temperatures are between 100° C. and 300° C., preferably 140° C. to 250° C., particularly preferably 160° C. to 220° C.

The reaction mixture, in the above described high-viscosity reactors, has a residence time of 0.5 to 300 minutes, preferably 1 to 60 minutes, particularly preferably 2 to 20 minutes.

The invention further relates to a process for the preparation of polyaspartic acid and salts thereof.

The polymerization products can be converted into the corresponding polyaspartic acid salt by dissolution in a base at 20° to 95° C., preferably 40° to 70° C., particularly preferably 50° to 70° C. It is also possible, already at this stage, to obtain the free polyaspartic acid by hydrolysis in water at 80° C. to 100° C. or by treatment of the salt with acids or acidic ion exchangers. The term "polyaspartic acid" likewise includes the salts in the present invention unless expressly stated otherwise. The product is obtained as a fine powder by spray drying.

The salts (e.g. sodium salt) prepared by this process have the properties of a dispersant and sequestering agent and also of a corrosion inhibitor and can be used in corresponding applications. Moreover, an antimicrobial action can be detected, that is, against fungi and bacteria.

The polymer prepared, depending on the reaction conditions, e.g. residence time and temperature of the thermal polymerization, shows different chain lengths or molecular weights after gel permeation chromatographic analysis ($M_w$=500 to 10,000, preferably 1,000 to 5,000, particularly preferably 2,000 to 4,000). The proportion of the β-form is generally more than 50%, in particular more than 70%.

The invention finally relates to a process for the preparation of polyasparagine having repeating units of the structures

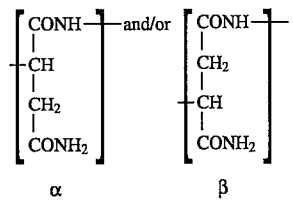

from maleic acid anhydride and ammonia, characterized in that the starting compounds are brought to reaction in a tubular reactor with feed nozzle in a molar excess of ammonia. 1.5 to 2.5 mol of ammonia are preferably used in this case, in particular about 2 mol of ammonia, per mol of maleic acid anhydride, the remaining reaction conditions being essentially the same as in the preparation of polysuccinimide. The polyasparagine obtained can likewise be hydrolysed.

The compounds according to the invention are used in particular as dispersant, detergent additive, sequestering agent, scale inhibitor, corrosion inhibitor, especially for brass, and as a microbicide. Moreover, they can be used in fertilizers.

EXAMPLES

The following examples were carried out in a tubular reactor with feed nozzle. For the polymerization, a continuous self-cleaning co-rotating twin screw machine fitted with hollow shafts was provided downstream. In the examples, molten maleic acid anhydride was fed in as primary component with a high relative velocity through a nozzle into a tubular reactor, through which flowed an aqueous, approximately 25% strength or 50% strength, ammonia solution as secondary component. The tubular reactor was closed by a pressurizing apparatus, possibly in the form of an orifice, which also acted as a disperser. This pressurizing valve ensured the achievement of a homogenously single-phase mixing within the reaction space. A pressure of 20 or 65 bar was established in the trials. Subsequently to this valve, depressurization to atmospheric pressure took place. From there, the reaction mixture was passed via a tube to the polymerization on the screw.

Example 1

A tubular reactor with feed nozzle having a nozzle cross-section of 0.4 mm was used. The pressurizing valve at the end of the reaction space was set to 15 bar. A delay section of 1 m in length was connected to the reaction space. The residence time within the reaction space was approximately 1.4 seconds. The total residence time including the delay section was approximately 15 seconds. A 25% strength aqueous $NH_3$ solution was pumped into the reaction space as secondary component at an admission pressure of 25 bar and a metering rate of 11.4 kg/h. A maleic acid anhydride melt was injected as primary component, into the ammonia solution flowing through the reaction chamber, at an admission pressure of 28 bar and a metering rate of 15.7 kg/h. The temperature in the reaction chamber was 180° C. to 185° C. In the depressurization to atmospheric pressure, there was a temperature reduction to 120° C. to 125° C. as a result of the spontaneous evaporation of part of the water. The reaction mixture preconcentrated in this manner was then polymerized at 170° C. to 175° C. on a heatable twin-screw co-rotating screw machine at a residence time of 10 minutes. A coarse-grained to powdery, pink to orange product was obtained in this case (see Table 1).

Example 2

The reactor from Example 1 was again used. The differences in this case were on the one hand the nozzle cross-section, which was 0.7 mm, and on the other hand the pressurizing apparatus which was set to 20 bar. The residence time within the reaction space was this time approximately 0.4 seconds. The total residence time including the delay section was approximately 1.6 seconds. 25% strength aqueous ammonia solution was pumped into the reaction space at an admission pressure of 30 bar and a feed rate of 34.3 kg/h. The maleic acid anhydride melt was injected into the ammonia solution flowing through the reaction chamber at an admission pressure of 36 bar and a metering rate of 45.8 kg/h. The temperature in the reaction chamber was 185° C. Downstream of the pressurizing apparatus, the reaction mixture was depressurized to atmospheric pressure. A cooling to 135° C. to 140° C. occurred in this case as a result of the spontaneous evaporation of part of the water. This preconcentrated reaction mixture was immediately polymerized on a heatable twin-screw co-rotating screw machine at 170° C. to 175° C. and a residence time of approximately 10 minutes. A coarse-grained to powdery, pink to orange product was obtained (see Table 1).

Example 3

The trial was carried out in the same reaction equipment and under the same conditions as in Example 1.

However, the following initial quantities were used: 25% strength aqueous $NH_3$ solution was pumped as secondary component into the reaction space at an admission pressure of 25 bar and a metering rate of 17.7 kg/h. The maleic acid anhydride melt was injected into the reaction space, through which flowed the secondary component, at an admission pressure of 30 bar and a velocity of 12.8 kg/h. Further processing proceeded as in Example 1. The product obtained was a coarse-grained orange solid (see Table 1).

Example 4

The reactor from Example 1 having a nozzle cross-section of 0.7 mm was again used. The residence time within the reaction space was 1 second this time and the system pressure was about 60 bar. In this trial, 50% strength aqueous ammonious solution was pumped into the reaction space at an admission pressure of 65 bar and a feed rate of 15.7 kg/h. The maleic acid anhydride melt was injected into the ammonia solution flowing through the reaction chamber, at an admission pressure of 65 bar and a metering rate of 44.4 kg/h. The temperature in the reaction chamber was 250° to 275° C. Downstream of the pressurizing apparatus, the reaction mixture was depressurized to atmospheric pressure, part of the water evaporating spontaneously. A cooling occurred in this case to about 140° C. to 150° C.

A yellowish-orange aqueous melt solution, viscose at 140° C. was obtained, which solidified plastically on cooling to room temperature. Analysis of this melt solution showed that marked polymerization had already taken place. A mean molecular weight $M_W$ of 1,150 was thus found after GPC measurement.

The melt solution, for secondary polymerization at 170° C. to 175° C., was brought to the high-viscosity reactor used in Example 1. A powdery pink to orange product was obtained in this case (see Table 1).

Example 5

The reactor from Example 1 having a nozzle cross-section of 0.7 mm was again used. The residence time within the reaction space was 5 seconds this time and the system pressure was about 65 bar. In this trial, 50% strength aqueous ammonia solution was pumped into the reaction space at an admission pressure of 70 bar and a feed rate of 15.7 kg/h. The maleic acid anhydride melt was injected into the ammonia solution flowing through the reaction chamber, at an admission pressure of 70 bar and a metering rate of 44.4 kg/h. The temperature in the reaction chamber was 320° to 330° C. Downstream of the pressurizing apparatus, the reaction mixture was depressurized to atmospheric pressure, part of the water evaporating spontaneously. A cooling occurred in this case to about 250° C. to 260° C. (measurement directly downstream of the orifice).

The hot mixture was passed into a cooled receiver. An orange-red melt solution is obtained, which, according to GPC measurement, had a mean molecular weight $M_W$ of 1,700. By addition of water, a light-orange solid can be separated off from this melt solution, which solid is composed of polysuccinimide. The mean molecular weight $M_W$ was 2,700. The polysodium salt obtainable by alkaline hydrolysis from the melt solution already shows good sequestering and dispersion properties, so that for certain applications, a secondary polymerization in the high-viscosity reactor can be dispensed with.

Example 6

The reactor from Example 1 now having a nozzle cross-section of 0.35 mm was again used. The residence time within the reaction space was 6 seconds this time and the system pressure was about 20 bar. In this trial, 40% strength aqueous ammonia solution was pumped into the reaction space at an admission pressure of 25 bar and a feed rate of 10.5 kg/h. The maleic acid anhydride melt was injected into the ammonia solution flowing through the reaction chamber, at an admission pressure of 25 bar and a metering rate of 24.0 kg/h. The temperature in the reaction chamber was 230° to 235° C. Downstream of the pressurizing apparatus, the reaction mixture was depressurized to atmospheric pressure, part of the water evaporating spontaneously. A cooling occurred in this case to about 200° C. to 210° C. (measurement directly downstream of the orifice).

The hot mixture was passed into a cooled receiver. An high viscose orange-red melt solution was obtained, which, according to GPC measurement, had a mean molecular weight $M_W$ of 2,700.

Analysis:

TABLE 1

| | Examples | | | | | |
|---|---|---|---|---|---|---|
| | 1 | 2 | 3 | 4 | 5 | 6 |
| Ratio MA:$NH_3$ | 1:1 | 1:1 | 1:2 | 1:1 | 1:1 | 1:1 |
| Reaction nozzle/product yield [kg/h] | 26.5 | 77.5 | 28.5 | 55.0 | 56 | 29.0 |
| $M_W$ (according to GPC) | 2950 | 3025 | — | 3075 | 1700 | 2700 |
| Acid number [mg of NaOH/g of PSI] | 412 | 404 | — | 410 | — | 405 |

[1] The molar mass distribution was determined, after conversion into the sodium salt, with the aid of gel permeation chromatography (GPC) by measurement against a calibration standard. The calibration standard used was polyaspartic acid sodium salts of known molar mass from the Sigma company.

The structure of the polymerization products was analysed by $^{13}C$—NMR and FT—IR. It was found in this case that the products prepared in Examples 1, 2 and 4–6 were chiefly composed of polysuccinimide. Polyaspartic acid was found in small amounts as by-product. In Example 3, the product was chiefly composed of polyasparagine and contained only relatively small amounts of polysuccinimide.

In Example 3, because of the lack of a calibration standard, the report of a molar mass distribution was dispensed with.

However, alkaline hydrolysis can prepare the polyaspartic acid sodium salt from the polyasparagine. GPC analysis of the hydrolysis product gave a $M_w$ of 2,900.

We claim:

1. Process for the preparation of polysuccinimide from maleic acid anhydride and ammonia, comprising: mixing or emulsifying a primary component consisting of a) maleic acid anhydride or b) maleic acid anhydride and water or a solvent, with a secondary component consisting of a) ammonia or b) ammonia and water or a solvent, in a tubular reactor, wherein said primary component is introduced into said secondary component from a nozzle in said tubular reactor.

2. Process according to claim 1, wherein the primary component consists of maleic acid anhydride and the secondary component consists of ammonia and water.

3. Process according to claim 1, wherein the primary component and the secondary component are brought to reaction in the reactor at a temperature of 50° C. to 500° C. to form reaction products.

4. Process according to claim 1, wherein the residence times in the reactor are 0.1 to 600 seconds.

5. Process according to claim 3, wherein the reaction products obtained in the tubular reactor are further polymerized thermally in a high-viscosity reactor.

6. Process according to claim 1, wherein the primary component is injected as a liquid stream directly into a liquid stream of the secondary component so that turbulence generated by different velocities of the two liquid streams results in said mixing or emulsifying of the primary and secondary components.

7. Process for the preparation of polyaspartic acid, wherein polysuccinimide prepared according to claim 2 is hydrolysed.

8. Process according to claim 7, wherein the hydrolysis is carried out at pH 7 to 12 and a temperature of 20° C. to 95° C.

9. Process for the preparation of polysuccinimide derivatives and polyaspartic acid derivatives by reaction of polysuccinimide and/or polyaspartic acid with other reactants, wherein a polysuccinimide and/or a polyaspartic acid obtained according to claim 1 is used.

10. Process for the preparation of water treatment agents which contain polysuccinimide and/or polyaspartic acid, wherein a polysuccinimide or a polyaspartic acid prepared according to claim 1 is used.

11. Process for the preparation of polyasparagine from maleic anhydride and ammonia, comprising: mixing or emulsifying a primary component consisting of a) maleic anhydride; or b) maleic anhydride and water or a solvent, with a secondary component consisting of a) ammonia; or b) ammonia and water or a solvent, in a tubular reactor at a molar excess of ammonia, wherein said primary component is introduced into said secondary component from a nozzle in said tubular reactor.

12. Process for the preparation of polyaspartic acid, wherein polysuccinimide prepared according to claim 1 is hydrolysed.

13. Process according to claim 7, wherein the hydrolysis is carried out at pH 7 to 12 and a temperature of 20° C. to 95° C.

14. Process for the preparation of water treatment agents which contain polysuccinimide and/or polyaspartic acid, wherein a polysuccinimide or a polyaspartic acid prepared according to claim 7 is used.

15. Process for the preparation of polyaspartic acid, wherein polysuccinimide prepared according to claim 2 is hydrolysed.

16. Process for the preparation of polysuccinimide comprising:
   a) passing a secondary component through a tubular reactor;
   b) mixing a primary component with said secondary component by injecting said primary component into said secondary component from a nozzle located within said tubular reactor; and
   c) reacting said primary component with said secondary component;
   wherein said primary component consists of a) maleic acid anhydride; or b) maleic acid anhydride and water or a solvent, and said secondary component consists of a) ammonia; or b) ammonia and water or a solvent.

17. Process according to claim 16, wherein said reacting occurs at least partially within said tubular reactor.

18. Process for the preparation of polysuccinimide comprising:
   a) passing a secondary component through a tubular reactor;
   b) mixing a primary component with said secondary component by injecting said primary component into said secondary component from a nozzle located within said tubular reactor; and
   c) reacting said primary component with said secondary component;
   wherein said secondary component consists of a) maleic acid anhydride; or b) maleic acid anhydride and water or a solvent, and said primary component consists of a) ammonia; or b) ammonia and water or a solvent.

19. Process for the preparation of polyaspartic acid, wherein polysuccinimide prepared according to claim 18 is hydrolysed.

20. Process according to claim 18, wherein the primary component and the secondary component are brought to reaction in the reactor at a temperature of 50° C. to 500° C. to form reaction products.

21. Process according to claim 18, wherein the reaction products obtained in the tubular reactor are further polymerized thermally in a high-viscosity reactor.

* * * * *

UNITED STATES PATENT AND TRADEMARK OFFICE
CERTIFICATE OF CORRECTION

PATENT NO. : 5,493,004
DATED : February 20, 1996
INVENTOR(S) : Groth, et. al.

It is certified that error appears in the above-indentified patent and that said Letters Patent is hereby corrected as shown below:

On the cover page, a section [30] should be inserted entitled, Foreign Application Priority Data and should list the following priority application data:

Nov. 2, 1993 [DE] Germany......................43 37 337.2

In Column 10, line 4, "claim 7" should be --claim 12--.

In Column 10, line 10, "claim 7" should be --claim 12--.

Signed and Sealed this

Eleventh Day of February, 1997

Attest:

BRUCE LEHMAN

*Attesting Officer*  *Commissioner of Patents and Trademarks*